No. 842,266. PATENTED JAN. 29, 1907.
C. L. TAYLOR.
INGOT STRIPPER.
APPLICATION FILED APR. 18, 1906.
2 SHEETS—SHEET 1.
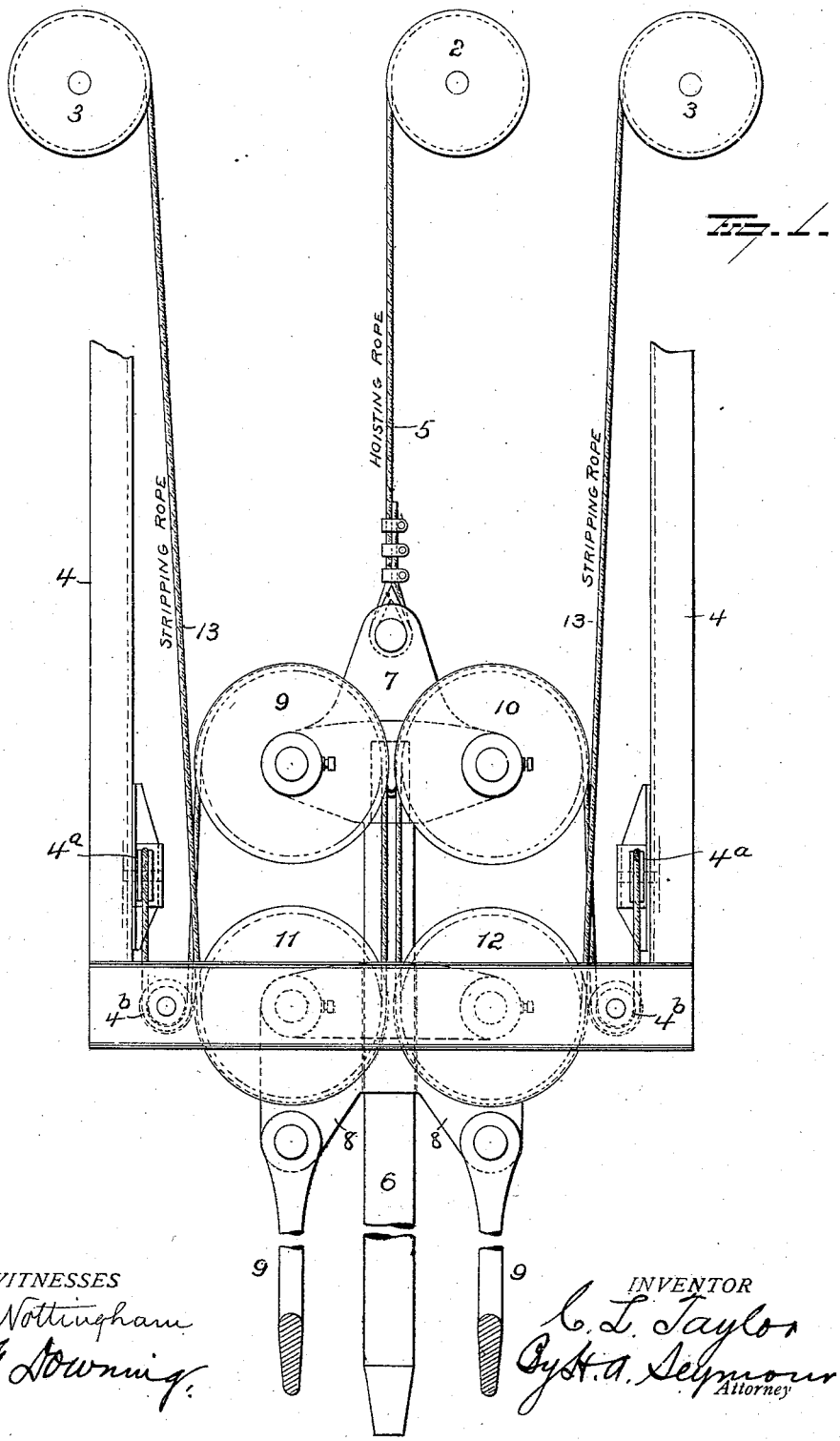

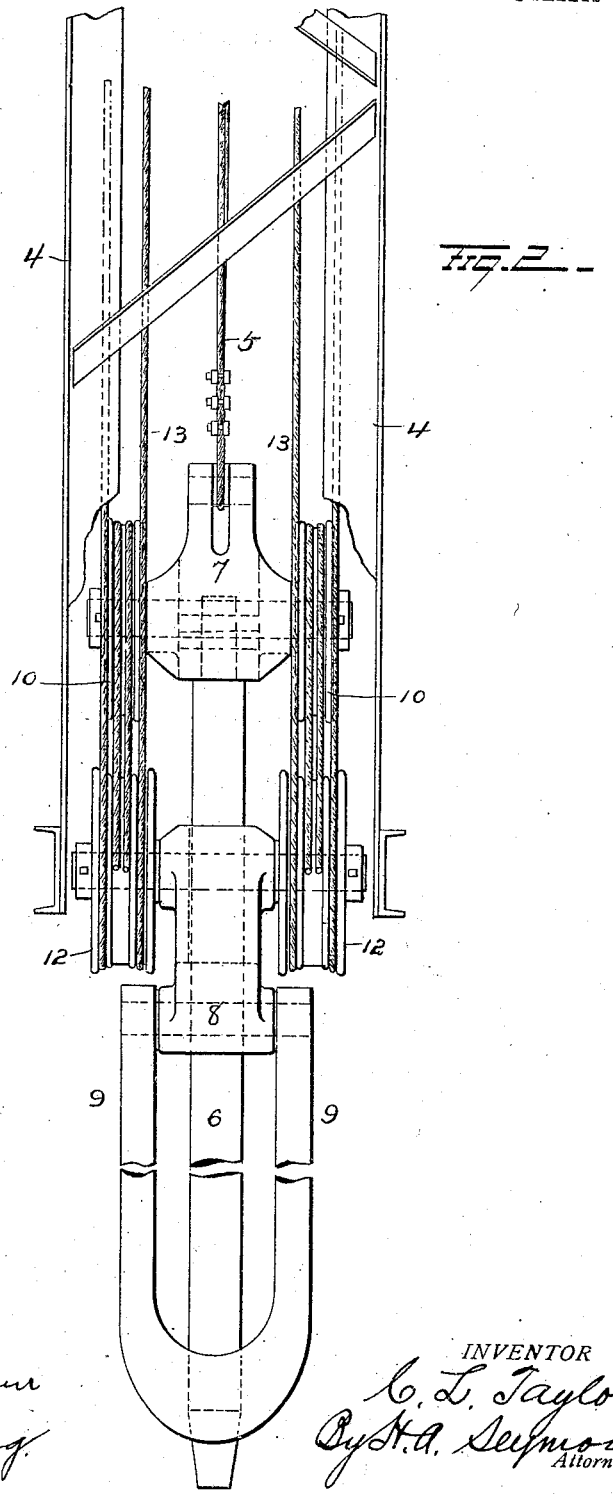

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

INGOT-STRIPPER.

No. 842,266.　　　Specification of Letters Patent.　　　Patented Jan. 29, 1907.

Application filed April 18, 1906. Serial No. 312,468.

*To all whom it may concern:*

Be it known that I, CLARENCE L. TAYLOR, of Alliance, in the county of Stark and State of Ohio, have invented certain new and useful Improvements in Ingot-Strippers; and I do hereby declare the following to be a full, clear, and exact description of the invention, such as will enable others skilled in the art to which it appertains to make and use the same.

My invention relates to an improvement in ingot-strippers, the object being to connect the mold-grasping devices and the ingot-plunger by flexible devices, the latter being so arranged that the amount of power that can be applied to the mold-grasping devices and plunger is practically unlimited, thus overcoming the objections incidental to devices wherein the total amount of power that can be applied is dependent upon the total weight of the mold and ingot supported by the mold-grasping devices.

With these ends in view my invention consists in the parts and combinations of parts, as will be more fully explained, and pointed out in the claims.

In the accompanying drawings, Figure 1 is a view in side elevation of my improvement, the hoist and stripping drums being shown diagrammatically and the trolley omitted; and Fig. 2 is a view in end elevation of same, the drums being omitted.

This stripping mechanism is preferably carried by a traveling trolley; but as it may be suspended from drums mounted on immovable supports I have simply illustrated the drums diagrammatically.

2 represents a hoisting-drum, and 3 3 stripping-drums, suitable motors and gearing being provided for rotating the hoisting and stripping drums.

4 is a support or casing rigidly secured to and depending from the trolley or other support and of a size sufficient to receive and wholly or partly inclose the stripping mechanism, which latter is suspended by the hoist rope or chain 5. This hoist rope or chain 5 is connected at its lower end to the plunger 6 or to the frame 7, carrying the plunger, and is secured at its upper end to the hoist-drum 2. Slidingly mounted on the plunger 6 is the frame 8, carrying the mold-grasping arms 9, the latter being provided with eyes or loops for engaging lugs or ears on the sides of the mold. Carried by the frame 7 are two series of sheaves 9 and 10, located on opposite sides of the plane of the plunger 6, and mounted in the brackets carried by the frame 8 are two series of sheaves 11 and 12, the latter being located, respectively, in the vertical planes of the sheaves 9 and 10.

Looped around a roller $4^a$, journaled to the frame 4, is a stripping rope or chain 13, both ends of which pass down and around pulleys $4^b$, also journaled in frame 4, up and around sheaves 10 on the frame 7, down and around sheaves 12, and up to its stripping-drum 3, both ends of the rope or chain being secured to the drum. The other stripping rope or chain is similarly secured and engages the sheaves 11 and 9 on frames 8 and 7.

Instead of employing a single rope on each side two ropes may be used, the two ropes or chains being secured each at one end to the drums at their other ends at the points $4^a$. I prefer, however, to employ a single rope passing around a pulley at the point $4^a$, as by such an arrangement all slack and any stretching of the rope will be taken up and compensated for and the strain will be evenly borne by both sections of the rope or cable.

In the operation of the device when the hoisting-drum 2 is revolved the entire stripping mechanism will be raised or lowered without causing any movement of the frame 8 on the plunger. When, however, the plunger 6 has been lowered onto the top of an ingot and the mold grasped by the arms 9, it will be seen that the winding up of the ropes or chains 13 on the stripping-drums 3 will tend to force the plunger 6 downwardly and the frame 8 upwardly; but as the plunger 6 is suspended from rope or chain 5 there can be no downward movement of the latter. The frame 8, carrying the mold-grasping arms, is, however, free to rise and its upward movement operates to strip the mold from the ingot, the latter being restrained from upward movement by the plunger 6. As the ropes or chains 13 are secured at their lower ends, it will be seen that the amount of power which can be applied to the plunger and mold-grasping arms is not dependent on the total weight of the ingot and mold, but is practically unlimited. Again, with my improved construction the ingot is not lifted off the car, as the plunger is first lowered against the ingot and operates to restrain any upward movement of the ingot, except that due to the penetration of the plunger into soft metal at the top of the ingot.

It is evident that many slight changes might be made in the relative arrangement of parts shown and described without departing from the spirit and scope of my invention. Hence I would have it understood that I do not wish to confine myself to the exact construction of parts shown and described; but, Having fully described my invention, what I claim as new, and desire to secure by Letters Patent, is—

1. In an ingot-stripper, the combination with a frame carrying a plunger, a frame carrying mold-grasping arms and sheaves carried by said frames, of a stripping-drum, stripping ropes or chains secured thereto, passing around the sheaves on the two frames and secured to fixed parts.

2. In an ingot-stripper, the combination with a frame carrying a plunger, a hoist-rope and drum therefor, a frame carrying mold-grasping arms, and sheaves on the two frames, of stripping ropes or chains passing around the sheaves on the two frames and secured to parts fixed with relation to the movable parts of the stripping mechanism, and means for operating said ropes or chains.

3. The combination with a trolley and supports depending therefrom, of a frame carrying a plunger, a frame carrying mold-grasping arms, sheaves on said frames, stripping ropes or chains secured at their lower ends to said supports, and passing around said sheaves, means on the trolley for actuating said stripping ropes or chains, a hoist-drum and a hoist-rope carried thereby and carrying the stripping mechanism.

In testimony whereof I have signed this specification in the presence of two subscribing witnesses.

CLARENCE L. TAYLOR.

Witnesses:
N. C. FETTERS,
E. J. PARKER.